United States Patent [19]
Battaerd et al.

[11] 3,891,576
[45] June 24, 1975

[54] PROCESS

[75] Inventors: Hendrik Adrian Jacobus Battaerd, North Clayton; Brian Alfred Bolto, Mitcham; Pir Ghulam Samadani Shah, East Kew, all of Australia

[73] Assignees: ICI Australia Limited, Melbourne, Australia; Commonwealth Scientific and Industrial Research Organization, Campbell, Australia

[22] Filed: May 14, 1973

[21] Appl. No.: 360,188

[30] Foreign Application Priority Data
May 31, 1972 Australia.......................... 9168/72

[52] U.S. Cl... 260/2.1 R; 204/159.22; 260/78.5 BB; 260/80.3 N; 260/86.1 N
[51] Int. Cl. ............................................ C08f 15/00
[58] Field of Search............. 260/2.1 R; 204/159.22

[56] References Cited
UNITED STATES PATENTS 3,032,538  5/1962  Spaulding et al. ............... 260/80.3
3,619,394  11/1971  Battaerd ........................ 204/159.22

Primary Examiner—Melvin Goldstein
Attorney, Agent, or Firm—Cushman, Darby & Cushman

[57] ABSTRACT

A process of manufacturing a polymeric composition of ion-exchange resins possessing amphoteric characteristics. The compositions are produced by reacting in the presence of a free radical initiator a heterogeneous mixture comprising an aqueous solution of an allylamine salt containing more than one allyl substituent of a strong acid and a compound selected from the group consisting of ethylenically unsaturated acids and organic derivatives of ethylenically unsaturated acids. The mixture is further characterized in that a major proportion of the noted compound is present in a separate phase finely dispersed in the aqueous solution. The amphoteric ion-exchange resins so produced find utility in the purification of biological media and polymers, and pharmaceuticals, for example, penicillin, cosmetics, slow release medicines and water demineralization processes.

10 Claims, No Drawings

PROCESS

This invention is concerned with ion-exchange resins which have both acidic and basic ion-exchange sites. Such "amphoteric" resins may be formed as a composite of acidic and basic ion-exchange sub-particles or moieties in an ion-permeable matrix, as a true or block copolymer, as a resin comprising an interlocked mixture of at least two polymers — which may be in the form of either interpenetrating networks or the so-called "snake-cage" polymers — or as a resin comprising a mixture of these two types of structure in the one composition having these desired ion-exchange properties.

Amphoteric ion-exchange resins are of use in the purification of biological media and polymers, and pharmaceuticals, for example, penicillin, cosmetics, slow release medicines and water demineralisation processes. Amphoteric ion-exchange resins are of use because of their property of sequestering or chelating metal ions, in particular heavy metal ions.

Amphoteric ion-exchange resins also have a potentially important application in water demineralisation processes using thermally regenerably ion exchange resins, for example, the 'Sirotherm' process. (Sirotherm is a Trade Mark for ICI Australia's thermally regenerable ion exchange resins). The Sirotherm process is described in the publications:

"The 'Sirotherm' Demineralisation Process — an Ion Exchange Process with Thermal Regeneration," Part 1. J. Inst. Engr. Aust. (1965) 37, 193;

"An Ion Exchange Process with Thermal Regeneration," Aust. J. Chem. (1966), 19, 561 (Part II), 589 (Part III, 765 (Part IV) and 791 (Part V) and (1968), 21, 2703 (Part VI).

"Thermally Regenerated Ion Exchange Process - An Aid to Water Management," J. Water Poll. Control Fed. (1966), 38, 1782; and Australian Pat. No. 274,029.

Resins having a thermally regenerable ion exchange capacity of use in the Sirotherm process are of the weak-acid or weak-base type and have such inherently slow rates of salt-uptake that their use in conventional mixed-bed systems is impractical for large-scale water treatment. As it would be expected that smaller acidic and basic particles and closer particle spacing should greatly improve the rate of ion-exchange, attempts have been made to produce amphoteric resins having acidic and basic moieties; but, although the ion-exchange rates can be high, such polymers normally have a thermally regenerable ion-exchange capacity of no more than a few per cent of the chemically regenerable total capacity, and certainly below 0.2 meq/gm, which renders them quite impractical for water demineralisation.

One attempt to avoid these difficulties is the use of a particulate amphoteric ion-exchange resin in which minute but discrete particles of ion-exchange resins are incorporated in an ion-permeable matrix. Though the ion-exchange rates of such "plum-pudding" resins are inferior to the amphoteric polymers previously mentioned, the thermally regenerable capacities are superior, and the overall kinetics are much better than those of a conventional mixed bed.

It has been postulated that the ion-exchange rates of mixed beds of weak electrolytes are probably limited by the rate of proton transfer between the acidic and basic resins even where the dimensions of the ion-exchange particles and their spacing is of the order of microns; and that the ion-exchange capacity of an amphoteric polymer is probably limited by self-neutralisation, that is pairing of moieties of opposite polarity within the polymer itself. Thus, very close spacing of acidic and basic moieties is highly desirable but the tendency for self-neutralisation must be minimised. Moreover, it is also appreciated that self-neutralisation probably takes place to a large degree in the constituent acidic and basic components of the system before or during the formation of the final polymeric structure.

We have now found a method of reducing such self-neutralisation and thus of producing a resin having a higher capacity for ion-exchange.

Accordingly we provide a process of manufacturing a polymeric composition which process comprises re-acting in the presence of a free radical initiator a heterogeneous mixture comprising an aqueous solution of an allylamine salt of a strong acid and a compound selected from the group consisting of ethylenically unsaturated acids and derivatives of ethylenically unsaturated acids said mixture being characterised in that a major proportion of the said component is present in a separate phase finely dispersed in the aqueous solution.

We also provide the novel polymeric compositions prepared by the process of our invention.

The nature of the ethylenically unsaturated acid or derivative thereof is not narrowly critical, provided that a major proportion of the acid or derivative is not soluble in the aqueous solution of the allylamine salt and preferably polymerises or copolymerises in the presence of the allylamine salt and a suitable free radical initiators to give unleachable structures. The separate compound phase may be either a liquid immiscible with the aqueous phase or may be a solid phase. The compound phase is dispersed as particles in the size range 0.1 to 20 microns preferably 0.5 to 5 microns.

By strong acid we means a mineral acid such as e.g. hydrochloric, sulphuric, nitric or phosphoric acids.

The choice of unsaturated acid effects the ion exchange properties of the resulting resin composition.

The acid may be used as the free acid but preferably derivatives having suitable solubilities are used. The choice of derivative having the required solubility depends upon the particular reaction conditions. Suitable derivatives may be found by solubility experiments. Candidate compounds for such simple solubility experiments are preferably chosen from ethylenically unsaturated organic acids or derivatives thereof which acids contain a ratio of carbon atoms to acid groups in the range from 2:1 to 5:1 for example, maleic acid, fumaric acid, itaconic acid, acrylic acid, methacrylic acid, crotonic acid, allylacetic acid, butene di and tri carboxylic acids, citraconic acid and mesaconic acid, aconitic acid.

Derivatives which may have the required solubility characteristics include for example alkyl esters, acid anhydrides, imides and amides either unsubstituted or substituted with an alkyl or aryl group or groups.

Under most conditions the most preferred acid derivative is an aryl amide of maleic or acrylic acid for example N-phenyl maleamic acid.

The salts of certain metals also have the required solubility characteristics, thus, for example, zinc, barium or calcium salts of acrylic and methacrylic acid may be used in the process of our invention.

The nature of the allylamine salt is not narrowly critical and the composition of our invention may be prepared using any amine having one or more allyl substituent. Suitable allylamines include, for example, allylamine, lower alkyldiallylamines, such as methyldiallylamine and ethyldiallylamine, triallylamine, etc. Other suitable allylamines include compounds of the general formula I:

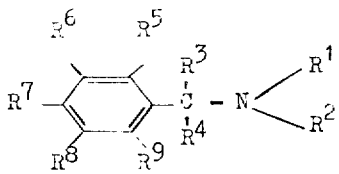

wherein $R^1$ is an allyl group.

$R^2$ is either a hydrogen atom or an alkyl, substituted alkyl, aryl, substituted aryl, alkaryl or aralkyl group, which group being either saturated or olefinically unsaturated; $R^3$ and $R^4$, separately, is a hydrogen atom, or an alkyl group; $R^5$, $R^6$, $R^7$, $R^8$ and $R^9$, separately, is a hydrogen or halogen atom or an alkyl, substituted alkyl, aryl, substituted aryl, alkaryl, aralkyl, nitro, hydroxy, alkoxy, aryloxy, alkoxycarbonyl, carboxy, carboxyalkyl, alkoxycarbonylalkyl, sulpho, alkoxysulphonyl, sulpho-alkyl, alkoxysulphonylalkyl, sulphonium, phosphono, dialkoxyphosphinyl, phosphonoalkyl, dialkoxyphosphinylalkyl, hydroxyphosphinyl, alkoxyphosphinyl, hydroxyphosphinylalkyl, alkoxyphosphinylalkyl, phosphonium, amino, dialkylamino, aminoalkyl, dialkylaminoalkyl, mercapto, mercaptoalkyl, quaternary ammonium, cyano, amido, cyanoalkyl, amidoalkyl,

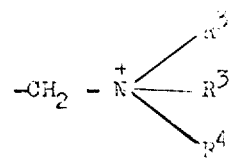

or

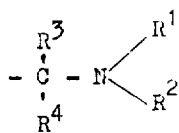

group except that not more than two of $R^5$, $R^6$, $R^7$, $R^8$ and $R^9$ may be the group

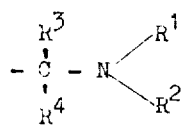

and wherein in addition $R^2$, $R^5$, $R^6$, $R^7$, $R^8$ and $R^9$ separately may be a heterocyclic ring which ring contains either 5 or 6 atoms optionally substituted.

Preferably the mono olefinically unsaturated group is allyl. A preferred class of compounds of general formula I as defined hereinbefore consists of compounds of general formula II:

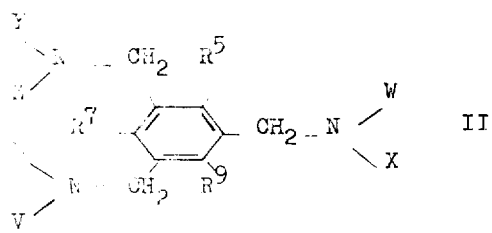

wherein $R^5$, $R^7$ and $R^9$ are as defined hereinabove and U, V, W, X, Y and Z are allyl. A further perferred class of compounds of general formula I as defined hereinabove consists of compounds of general formula III:

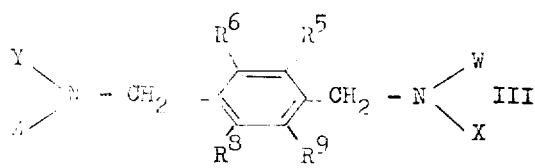

wherein $R^5$, $R^6$, $R^8$ and $R^9$ are as defined hereinabove and W, X, Y and Z are allyl.

Other suitable allylamines include compounds of the general formula IV:

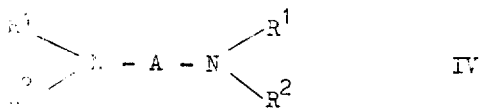

wherein $R^1$ and $R^2$ are as defined hereinabove and A is an alkylene group containing 2 to 8 carbon atoms preferably 5 to 7 carbon atoms. Generally speaking the pH, temperature and other conditions associated with the polymerisation process may be those known in the art for the polymerisation of the appropriate monomers concerned. The nature of the free radical initiator is not critical. Radiation-initiated polymerisation is particularly convenient. Nevertheless, monomers have been successfully polymerised by the use of potassium persulphate to yield a resin with analogous properties to those of essentially the same resin prepared in the same way but employing gamma radiation for polymerisation. Since aqueous solvent systems are preferred, water soluble catalysts of various sorts, such as cumene hydroperoxide and various other redox systems such as $K_2S_2O_8/K_2S_2O_5$ and cumene hydroperoxide/FeSO may be employed.

We prefer to use irradiation as the free radical initiator. Irradiation can be used to initiate the copolymerisation of all the allylamines in the form of salts.

Accordingly in a preferred aspect of our invention we provide a process of manufacturing polymeric compounds, said process comprising exposing the mixture as defined hereinbefore to high energy radiation at a temperature of between −80° and 120°C and isolating the polymer or polymer salt so formed.

By high energy radiation we mean radiation having a wavelength of less than 100 Angstrom, in particular gamma- and beta- rays derived from isotopes or in the form of fast electrons such as produced by a Van de Graaff generator and an electron accelerator. Other sources of ionising or high energy radiation are known in the art, e.g. from British Pat. No. 801,528, page 1, lines 49 - 56; these include neutrons, accelerated heavy particles and X-rays or mixtures of them. A convenient practical sources of high energy radiation is a Cobalt 60 source.

The dose rate or irradiation controls the rate of initiation of the polymerisation, but has little effect on the properties of the polymer formed. Dose rates between 10 rads/hr and 5 megarads/hr are operative and rates between 20,000 rads/hr and 1 megarad/hr are convenient in practice. However, the total dose delivered to the polymerisation mixture affects the yield as well as the physical properties of the polymer produced. Doses from 3 megarad up to 20 megarad are operative; optimum yield of polymer is usually achieved at 5 to 15 megarad. At doses above 10 megarad the polymer formed has reduced residual unsaturation, possibly due to further cross-linking of the resin as shown by the reduced water uptake values of the resin.

Radiation, usually and preferably, is carried out in an inert atmosphere such as nitrogen or argon. The presence of air does not stop the polymerisation, but a reduction in yield and capacity were observed.

For use as ion exchange resins the polymers and copolymers of this invention must be produced within controlled particle size ranges.

The particles of the required size range may be obtained by bulk polymerisation followed by grinding and sieving. Preferably the particles are prepared in the required size range by a dispersion polymerisation technique.

It will be appreciated by those skilled in the art that the solvent and monomer systems referred to the above concern the components which are actively involved in the production of the desired amphoteric resins; whether the resins are produced in bulk or particulate form can be determined by the use of a secondary liquid phase which need not include any reacting components but merely makes it possible to disperse the heterogeneous monomer mixture in a supporting medium which is immiscible with the solvent used to make up the monomer mixture.

The heterogeneous monomer mixture comprises a fine dispersion of the compound phase in the aqueous solution of the alkylamine salt. This mixture is suspended as a coarse suspension in the supporting medium. The size of the droplets of the coarse suspension are the size of the final beads of polymer and are conveniently 200 to 10 mesh BSS. By contrast the size of the compound phase in the fine dispersion is in the range from 0.1 to 20 microns preferably in the range from 0.5 to 5 microns.

In this way, the product can be made in the form of particulate bead-like material having a particle size which makes it suitable for use in mixed-bed ion-exchange columns. This size of the beads depends on the concentration of stabilisers, the monomer solution, the stirring rate, the temperature and the geometry of the reaction vessel. Beads between 200 mesh BSS and 10 mesh BSS can easily be achieved. The choice of supporting medium is not narrowly critical, provided the insolubility requirements are satisfied. Suitable supporting media are for example aromatic solvents or petroleum ethers. The choice of stabiliser is not narrowly critical; certain surfactants used in dispersion polymerisation, e.g. hydrocarbon soluble amines or quaternary ammonium terminated surface active agents as well as cellulose ethers or polyvinyl alcohols and derivatives of polyvinyl alcohols are suitable.

The choice of solvent system also has an influence on the pH which will be chosen for polymerisation but, generally speaking, the polymerisation pH will be found to lie between 3.5 and 6.8, though some combinations of monomers will require the polymerisation pH to lie outside this range.

To some extent, another factor influencing polymerisation pH conditions is the choice of monomer ratios to give the required ratio of acid and basic groups. While it will be usual to attempt to make the number of acidic and basic sites in the product resin approximately equal, the optimum ratio from the standpoint of certain ion-exchange process may not be 1:1.

The compositions produced by the process of our invention may require hydrolysis to remove groups blocking the acidic sites of the resin. We have found that using acidic derivatives of maleic acid the resultant composition comprises free basic and acidic groups. However we prefer to treat all the products to a reaction procedure to remove all blocking groups. Any procedure known in the art may be employed which is capable of removing the blocking group but not capable of destroying the polymer chain. Thus the reaction procedure may be, for example, hydrolysis by treatment of the polymeric composition with dilute aqueous acid or alkali. We prefer where possible to treat the polymeric resin with dilute aqueous caustic soda solution under reflux for several hours.

Following polymerisation and unblocking, it is preferable to subject the product resin — preferably in particulate form — to a pH equilibration treatment to achieve the optimum ion-exchange performance. Normally, this simply involves stirring the resin in an aqueous salt solution at room temperature (ca. 20°C) and adding sodium hydroxide until the desired pH level is obtained, care being taken to ensure that the final equilibrium salt concentration is at the required level. The salt concentration employed is that of the water to be treated by the desalination process. The resin is now suitable for use in column operation of a thermally regenerable process, as described in our prior Australian Pat. No. 274,029. For purposes of evaluation, however, the resin may be washed with hot water at ca. 80°C to obtain it in a regenerated form, and the amount of salt taken up by stirring the regenerated resin in salt solution at room temperature used as a measure of the effective capacity of the system. The time necessary to achieve salt uptake equivalent to 50 percent of the equilibrium level (the half time) may be used as a convenient measure of the rate of salt absorption.

Finally, it will be appreciated that the amphoteric resins formed in accordance with the present invention must differ from the prior art amphoteric resins where self-neutralisation must involve alignment of oppositely charge sites which, from the steric or structural standpoint, defines a resin which is significantly different from one where self-neutralisation has been prevented and the sites are randomly disposed within the structure. However, while this difference in structure is difficult to define by chemical or physical analysis, a ready indicator is provided by the significantly increased effective capacity.

The ion-exchange capacity of the product produced by our process depends to a great extent on the monomers used.

Suitable combinations of monomers to give a desired ion-exchange capacity may be found by simple experiment.

Thermally regenerable resins have a potentially important application in water demineralisation processes because low-grade heat can be efficiently employed for regeneration and certain of these resins are of use in the desalination of water by the so-called Sirotherm process.

Polymeric compositions having suitable ion-exchange properties for the Sirotherm process may be made by the process of our invention followed by a hydrolysis stage if necessary from mixtures comprising a molar ratio of allylamine salt to the acid or acid derivative in the range from 10:90 to 90:10 preferably from 30:60 to 70:40.

Thermally regenerable ion exchange resins are preferably prepared using an allylamine chosen from the group consisting of triallylamine, bis dialkylaminomethyl-1, 4-benzene and bis diallylamine-11,6-hexane and preferably the acid derivative is an aryl amide of maleic acid e.g. N-phenyl maleamic acid.

The compounds of our invention may be used as chelating agents and sequestering agent.

The invention is illustrated by but by no means limited to the following examples in which all parts are parts by weight unless otherwise specified.

EXAMPLE 1

This is a comparative example not of our invention. 5 grms of maleic acid were dissolved in 30 ml of acetone to give a clear solution. This clear solution was then poured into a 60 ml capacity pyrex glass test tube to which was attached a 4mm pyrex vacuum tap. Before irradiation the solution was deoxygenated by a vacuum freeze thaw cycle. This was performed as follows. The test tube assembly was placed in a slush of acetone and dry ice and the solution allowed to freeze. The tap was then connected to a vacuum system operated by a backing pump. This pumping was continued for two minutes. The vacuum tap was then closed, the tube removed from the dry-ice slush and allowed to warm up to room temperature slowly. The tap was then again opened and pumping restarted for ½ minute. At the end of this period the vacuum tap was again closed and the solution of maleic acid refrozen and the above cycle repeated a number of times to ensure complete oxygen removal.

The test tube was irradiated using a $Co^{60}$ irradiation source, the tube being placed approximately at the centre of the irradiation field. The solution was irradiated to a total dose of 13 megards, at a dose rate of 0.34 megards an hour. On the termination of radiation the tube was removed and the contents inspected for any polymer formation. It was observed that no solid polymer had been formed.

EXAMPLE 2

This is a comparative example not of our invention. 100 ml of triallylamine hydrochloride (75 percent $w/v$) pH 5.2, 0.41 moles was dissolved in 30 ml of acetone and put into a test tube and the deoxygenation and irradiation were carried out in an exactly similar manner as in Example 1. After a total dose of 13 megarads, at a dose rate 0.34, the reaction was terminated. The tube was seen to contain a white polymer. This polymer was washed on a vacuum sintered glass filter funnel in the following manner.

1. With water to remove acetone
2. With 2N Hcl (analar grade 33 percent $w/v$, $d = 1.118$) to remove any unreacted amine. The absence of amine was tested for by taking a sample of the filtrate in a test tube, adding two to three pellets of NaOH and testing the gases evolved for free amine. The washing with Hcl was continued until the reaction towards litmus was negative.
3. With 0.5 N NaOH solution to remove all traces of $Cl^-$ ion. The NaOH solution was passed through a column filled with resin 10 inches long and 1 inch in diameter, fitted with a porous sintered glass disc at one end connected to a reservoir of 0.5 N NaOH by means of a standard cone and socket fitting. Washing was continued until the washings were free of $Cl^-$.

The resin when free of $Cl^-$ ion was dried in a vacuum oven at 60°C for 12 hours.

The dried resin was tested for free base capacity as follows. 0.2 g of dried resin (accurately weighed) was placed in each of 12 "clinbritic" bottles of 60 ml capacity and varying amounts of 1,100 ppm NaCl and 0.1N HCl were added to each bottle as shown in the table below.

| Bottle Number | 1 | 2 | 3 | 4 | 5 | 6 | 7 | 8 | 9 | 10 | 11 | 12 |
|---|---|---|---|---|---|---|---|---|---|---|---|---|
| ml of 0.1N HCl | 20 | 18 | 16 | 15 | 14 | 13 | 12 | 11 | 7 | 5 | 2 | 0 |
| ml of 1100 ppm NaCl solution | 0 | 2 | 4 | 5 | 6 | 7 | 8 | 9 | 12 | 15 | 18 | 20 |

These bottles were sealed with rubber serum caps and finally secured with a screw cap, and allowed to shake on a vibrator shaker overnight to ensure that the resin had come to equilibrium with the solutions added. On attainment of equilibrium the bottles were allowed to stand for an hour or so to enable the resin to settle and the pH of the supernatant liquid measured by means of a pH meter. A standard pH curve was thus obtained and the capacity determined in the normal manner. A free base capacity of 6.7 – 7.2 meg/gm was obtained.

EXAMPLE 3

100 ml of aqueous triallylamine (70 percent $w/v$, pH 5.2, 0.41 moles) was mixed with 20 ml of 1 percent $w/v$ polyvinyl alcohol (PVA) solution in a beaker. The weight of PVA solution taken is 0.3 percent $w/w$ of the weight of monomer used. To this was added 5 g of maleic acid (0.043 moles), and made into a slurry in the beaker. This slurry was then added to a 600 ml capacity flanged flask containing 400 ml monochlorobenzene fitted with a lid holding an anchor stirrer, a gas inlet tube fitted with a tap and a gas outlet, likewise fitted. The monochlorobenzene did not act as a solvent for either maleic acid or triallylamine HCl. It is used only as a suspension medium. This slurry suspended in monochlorobenzene was thoroughly deoxygenated by bubbling oxygen free dry nitrogen through it via the inlet and outlet tubes for 15 minutes. The outlet gas tap was closed whilst the inlet tap remained open, i.e. the one connected to the nitrogen gas cylinder. This ensures a positive $N_2$ pressure over the reaction mixture, thus precluding the leakage of air into the reaction vessel. The mixture was stirred by means of a variable drive motor both during the deoxygenation step and throughout the irradiation. The flask was placed approximately in the centre of the radiation field from a $Co^{60}$ irradiation source and irradiated to total dose of 10 megarads at a dose rate of 0.34 megarads an hour. On termination of irradiation the final product consisted of yellow beads about 1mm in diameter and possessing a water regain value of 2.6 $H_2O$/g resin. However, these resin beads had poor mechanical stability.

EXAMPLE 4

100 ml of triallylamine HCl (75 percent w/v, 0.40 moles, pH 5.2) was mixed with 20 ml of a 1 percent polyvinyl alcohol solution. To this was added 157 g of N-phenyl maleamic acid (0.82 moles) to form a thick slurry. The N-phenyl maleamic acid was a fine yellow powder consisting of particles 1 – 3 microns in size and irregular in shape.

The slurry of triallylamine HCl and N-phenyl maleamic acid was added to 400 ml of monochlorobenzene and stirred with a glass rod to disperse the slurry uniformly. The mixture was then placed in an irradiation vessel of the same volume and geometry as described in Example 1. The deoxygenation procedures and irradiation method were as described in Example 1.

The polymer obtained had the following properties when irradiated as shown below.

| Resin | Total dose megarads | Dose rate megarads /per hour | Physical nature of polymer | Water regain $H_2O$ g/resin |
|---|---|---|---|---|
| A | 1.75 | 0.31 | Spherical beads 1 – 2 mm in diameter | 1.65 |
| B | 7.6 | 0.31 | as above | 0.7 |
| C | 22.6 | 0.31 | as above | 1.47 |
| D | 7.4 | 0.31 | as above | 1.10 |

The resin particles obtained on the completion of irradiation were washed and their capacity measured. The washing procedure was as follows. The crude beads were filtered on a vacuum porous plate filter funnel to remove any unreacted amine and monochlorobenzene in the bead slush. Thereafter the beads were repeatedly washed with alcohol to remove final traces of monochlorobenzene.

The beads were finally washed with 2N HCl until no free amine could be detected as described in Example 2.

Capacity Determination

The determination of the capacity of the washed ion-exchange beads can be divided into two parts namely:

a. Determination of the total ionic capacity i.e. acid and base capacities.
b. Determination of Sirotherm capacity i.e. regenerable capacity at 80°C. Each will be described separately.

Total Capacity

The total number of exchange sites were determined by the following general method. The resin was shaken with an excess of 2N HCl overnight, after which it is washed with distilled water until the effluent pH was 3. When this has been obtained the resin beads were dried in a vacuum oven overnight at 60°C.

About 1 g of the dried resin (accurately weighed) was placed in a 150 ml clinbritic bottle and 50 ml of 0.1N NaOH and 50.0 ml of distilled water were added and the bottle secured with a rubber serum cap and screw top and allowed to shake overnight. The resin was then filtered off and the filtrate kept for acid and base function evaluation. A known aliquot of the filtrate (10 ml) measured by pipette was placed in a shallow glass dish and acidified with one ml of dilute nitric acid. This solution was then stirred by means of a magnetic stirrer. The actual determination of base capacity was determined potentiometrically by titration against a standard 0.1N $AgNO_3$ solution.

To determine the total capacity of an amphoteric resin i.e. acid and base groups available for exchange a known aliquot (10 ml) of the solution was taken in an erlenmeyer titration flask and titrated against standard 0.1N HCl, using phenolphthalein as the indicator. The total capacity is the milligram equivalents of HCl used per g of resin. Therefore the base capacity equals the total milligram equivalents of hydrochloric acid used minus the total milligram equivalents of $AgNO_3$ used per g of resin.

From the above determinations the ratio of acid to base sites available can be calculated and compared to the theoretical composition calculated from the ratio of monomers used in synthesis of the resins.

Sirotherm Capacity

The resin was column washed as before until the pH of effluent is pH 3. This was then equilibrated to a specified pH value in 1,000 ppm NaCl solution by addition of dilute NaOH (0.1N). This took about 24 hours of shaking on a mechanical shaker before equilibrium was obtained.

The thermal regeneration was carrid out in a jacketed column fitted with a sintered porous glass disc at the lower end on which the resin was retained. Distilled $H_2O$ previously deoxygenated by bubbling through it oxygen free nitrogen flows from a reservoir through a jacketed coil condenser heated to 80°C before entering the regeneration column. Both condensers were connected to a thermobath maintained at 80°C. The water in the reservoir was kept flushed with nitrogen throughout the regeneration to ensure that the resin was kept oxygen free. The conductivity of the effluent was measured and the regeneration was considered to be complete when the conductivity had reached a constant value. This takes 4 – 8 hours. This regenerated resin was then dried in vacuo at 60°C for 24 hours. 0.3 gms of the dry resin was weighed into a 1 oz. clinbritic bottle and 25 ml of 0.02N NaCl solution was added. The mixture was shaken on a table top shaker for 48 hours and then an aliquot titrated against 0.10 $AgNO_3$ using the conductometric method described above. The Sirotherm capacity was the difference between the initial and final $AgNO_3$ titres.

The following results were obtained for resins A, B and C.

| Resin | Total Capacity meq/g | Base Capacity meq/g | Acid Capacity meq/g | Acid/Base Ratio |
|---|---|---|---|---|
| A | — | — | — | — |
| B | — | — | — | — |
| C | 4.4 | 1.2 | 3.2 | 2.7 : 1 |
| D | 4.7 | 0.97 | 3.93 | 3.8 : 1 |

The theoretical capacity (total) for resin C is 5.6 meq/gm compared to 4.4 meq/gm obtained experimentally (79 percent usable capacity). The Sirotherm capacity for resin C was 0.40 meq/g.

The total capacity for resin D was 5.6 meq/g compared to 4.7 meq/g obtained experimentally which is 84% of theoretical.

EXAMPLE 5

Example 4 was repeated except that the acid base ratio was 1:1 and not 4:1 as in the preceding sample. The resins produced had the following properties.

| Resin | Total Dose M/rads | Dose Rate | Water Regain g. $H_2O$ g. Resin | Total Capacity meq/g | Base Capacity meq/g | Acid Capacity meq/g | Acid/ Base Ratio |
|---|---|---|---|---|---|---|---|
|  |  | M/Rad per hour |  |  |  |  |  |
| D | 1.31 | 0.31 | 3.93 | — | — | — | — |
| E | 7.3 | 0.31 | 1.25 | 4.33 | 2.7 | 1.63 | 1:1.65 |

The Sirotherm capacity for resin E was 0.18 meq/g.

EXAMPLE 6

A standard attition was applied to determine the degree of mechanical strength the amphoteric beads possessed. 2 gms of the amphoteric resin beads 22 – 36 mesh obtained in Example 4 as Resin D were placed in a 100 ml clinbritic bottle to which 50 ml of distilled water had been added, along with three glass beads 1 cm in diameter. This bottle was sealed with a serum cap and a screw top and shaken on a table top shaker for 3 weeks without interruption.

At the end of 21 days the beads were filtered off, weighed and dried in vacuo at 60°F. They were then dry sieved through 22 –36 mesh for a screen analysis. It was found that the amphoteric beads had disintegrated to fines amounting to 4 percent of the dry weight over this period.

EXAMPLE 7

50 gms of styrene maleamic acid inter-polymer (SMAA) prepared by the method of MINSK & DUNHAM, J.Polym.Sci. A – 1, 4, 997 (1966), and 100 ml of TAA-HCl (75 percent w/v, pH = 5.2) was suspended in 400 ml of monochlorobenzene (MCB) in a round bottomed flask fitted with a stirrer and a $N_2$ gas inlet. This mixture was purged with $N_2$ prior to radiolysis, and oxygen excluded by a positive pressure of $N_2$ throughout. On termination of radiation a yellow white polymer consisting of irregular shaped particles was obtained. This was washed with alcohol to remove MCB and finally with 2M HCl. Acid, base, total capacity and effective capacities were then determined. The values obtained are listed in the following table. The experiment was repeated using 50 mls TAA.CHl (73 percent w/w).

| ml TAA-HCl | SMAA gms | MCB ml | Dose Rate M/rad Hr-1 | Total Dose M/rads | Total | Capacities Acid | Base | Effective |
|---|---|---|---|---|---|---|---|---|
| 100 | 50 | 400 | 0.31 | 6.6 | 4.8 | 1.05 | 3.7 | 0.29 |
| 50 | 50 | 1000 | 0.31 | 12.9 | 4.8 | 3.7 | 1.1 | 0.25 |

EXAMPLE 8

10 gms of styrene maleamic acid inter-polymer was dissolved in 500 ml of ethylene glycol and 50 ml of TAA—HCl added to give a clear viscous solution. This was irradiated in the absence of air as described in previous examples, to a total dose of 6.6 mega rads at a dose rate of 0.31 mega rads an hour. On termination of radiation it was observed that no polymer had been formed.

EXAMPLE 9

100 ml of TAA—HCl, 75 percent w/v, pH = 5.2 (0.43 moles) was mixed with 0.70 moles of zinc methacrylate. This slurry of zinc methacrylate and TAA—HCl was then added to 400 ml of MCB into which 0.25 gms of $N_{100}$ ethyl cellulose had been dissolved to act as a bead stabiliser. This mixture was purged with oxygen free dry nitrogen prior to radiolysis, and oxygen was excluded throughout the experiment by a positive $N_2$ pressure. Whilst being irradiated the reaction mixture was stirred by means of an anchor stirrer at a speed of 500 rpm. After a total dose of 10 mega rads, at a dose rate of 0.35 mega rads an hour the reaction was terminated. A yellow polymer granular in shape and insoluble in $H_2O$, HCl and NaOH was obtained.

We claim:

1. A process of manufacturing a polymeric composition which process comprises reacting in the presence of a free radical initiator a heterogeneous mixture comprising an aqueous solution of an allylamine salt containing more than one allyl substituent of a strong acid and a compound selected from the group consisting of ethylenically unsaturated acids and organic derivatives of ethylenically unsaturated acids said mixture being characterised in that a major proportion of the said compound is present in a separate phase finely dispersed in the aqueous solution.

2. A process according to claim 1 wherein the allylamine is chosen from the group consisting of triallylamine, methyldiallylamine, ethyldiallylamine, bisdiallylaminomethyl-1,4-benzene, bisdiallylamino-1,6-hexane and mixtures thereof.

3. A process according to claim 1 wherein the derivative of an ethylenically unsaturated acid is an aryl amide of maleic acid.

4. A process according to claim 3 wherein the aryl amide of maleic acid is N phenyl maleamic acid.

5. A process according to claim 1 wherein the derivative of an ethylenically unsaturated acid is a heavy metal salt of acrylic or methacrylic acids.

6. A process according to claim 1 wherein the separate phase is dispersed in the aqueous solution as particles in the size range from 0.5 to 5 microns.

7. A process according to claim 1 wherein the reaction is initiated with high energy radiation.

8. A process according to claim 1 wherein the reaction is initiated with a chemical free radical generator.

9. A process according to claim 1 wherein the heterogeneous mixture is dispersed in a liquid immiscible with the aqueous solvent used to make up the heterogeneous mixture.

10. A process according to claim 9 wherein the liquid immiscible with the aqueous solvent is an aromatic solvent or petroleum ether.

* * * * *